Patented Oct. 23, 1951

2,572,028

UNITED STATES PATENT OFFICE 2,572,028

HYDRAZODISULFONATE-POSITIVE HALOGEN OXIDIZING AGENT SYSTEMS FOR POLYMERIZATION INITIATION

Madison Hunt, Claymont, Del., assignor to E. I. du Pont de Nemours & Company, Wilmington, Del., a corporation of Delaware No Drawing. Application February 3, 1950,
Serial No. 142,358

3 Claims. (Cl. 260—80)

This invention relates to the addition polymerization of polymerizable organic compounds and more particularly to new polymerization catalyst systems.

Polymerization of ethylenically unsaturated compounds is a process of great technical importance. Generally employed as polymerization catalysts are compounds containing directly linked oxygen atoms such as benzoyl peroxide or potassium persulfate. In conventional polymerization systems, relatively high temperatures are required to obtain high rates of conversion of the monomeric unsaturate to a polymer. The use of elevated temperatures often leads to products of inferior qualities. In some instances where appreciable rates of polymerization have been achieved at lower temperatures, the products obtained have superior physical properties which are of substantial economic importance, such as, for example, the increased abrasion resistance of synthetic rubbers prepared at temperatures which are low. Accordingly, new and improved systems of low temperature addition polymerization in high conversion are of considerable interest.

This invention has as an object the provision of a new process for polymerizing addition polymerizable ethylenic compounds. Other objects will appear hereinafter.

These objects are accomplished by this invention wherein a monomer subject to addition polymerization by reason of a non-aromatic carbon carbon double bond is polymerized by bringing the same in contact with a hydrazodisulfonate and an oxidizing agent of the class consisting of compounds having halogen of positive valence of one.

The following examples in which parts are by weight are illustrative of the invention.

Example I

A glass vessel was charged with 13.2 parts of acrylonitrile, 220 parts of water, 0.88 part of pyridinium hydrazodisulfonate, and 0.30 part of "Dichloramine-T" (N,N-dichloro-p-toluenesulfonamide, oxidizing agent). The vessel was flushed with oxygen-free nitrogen and the vessel closed. After standing (with occasional agitation) for 1.5 hours at 25° C. the vessel was opened and the polymer isolated by filtration. A total of 10.9 parts of dry polymer was obtained corresponding to an 83% conversion.

Example II

When the general procedure of Example I was repeated except that 0.35 part of calcium hypochlorite monohydrate (oxidizing agent in place of the "Dichloramine-T") was added slowly with stirring and the temperature was 0° C. and 84% yield of polymer was obtained.

Example III

The general procedure of Example II was repeated except that in place of the 220 parts of water, a mixture of 120 parts ethyl alcohol and 125 parts of water was used and the temperature was maintained at −30° C. A 39% conversion of monomer to polymer was obtained. Under similar conditions but at −20° C., a 70% yield was obtained.

Example IV

The general procedure of Example I was repeated except that 0.25 part of 1,3-dichloro-5,5-dimethylhydantoin ("Dactin") was used as the oxidizing agent and the polymerization time was one hour, a yield of 50% of polymer was obtained.

Example V

A glass vessel equipped with stirrer, thermometer, gas inlet tube and Dry-Ice-acetone condenser system was charged with 150 parts of water, 80 parts of absolute ethyl alcohol, 1.76 parts of pyridinium hydrazodisulfonate, and, after cooling to −20° C. while the air was flushed by oxygen-free nitrogen, a total of 15.7 parts of vinyl chloride was introduced. The gas inlet tube was replaced by a dropping funnel and over a period of two hours, a total of 0.69 part of calcium hypochlorite monohydrate in 50 parts of water was added slowly with stirring. After an additional 30 minutes the polymer was removed by filtration. There was obtained 8.9 parts of polyvinyl chloride, corresponding to a 68% conversion. The polymer had a relative viscosity of 1.110 as measured on a 0.1 g. sample in 100 ml. of cyclohexanone.

Example VI

When Example V was repeated except that the hypochlorite employed was 3.24 parts of an 8% aqueous solution, there was obtained in one hour at −7 to −4° C., a 61% yield of polymer.

Example VII

A glass vessel equipped with stirrer, thermometer, gas inlet tube and condenser was charged with 56 parts of absolute ethyl alcohol, 50 parts of water, 0.88 part of pyridinium hydrazodisulfonate, 15.6 parts of vinyl chloride, and as oxidizing agent, 0.25 part of 1,3-dichloro-5,5-dimethylhydantoin. After 1.5 hours at 25° C., there was obtained a 49% conversion of monomer to polyvinyl chloride.

Example VIII

A glass vessel was charged with 25 parts of methyl methacrylate, 80 parts of ethyl alcohol, 125 parts of water, 0.88 part of pyridinium hydrazodisulfonate, and 3.24 parts of an aqueous solution containing 8% of hypochlorite ion as oxidizing agent diluted to 43 parts with water was added dropwise with stirring over a period of three hours at 0° C. There was obtained a 90% yield of polymer.

Example IX

A vessel was charged with 12.5 parts of methyl methacrylate, 48 parts of ethyl alcohol, 60 parts of water, 0.44 part of pyridinium hydrazodisulfonate and 0.125 part of 1,3-dichloro-5,5-dimethylhydantoin as the oxidizing agent. After two hours at 25° C., a 75% conversion of monomer to polymer was obtained.

Example X

When the general procedure of Example IX was repeated except that 0.15 part of "Dichloramine-T" was used as the oxidizing agent, a 60% conversion of monomer to polymer was obtained in 1.5 hours.

Example XI

Four emulsions were made by means of high-speed stirring at 10° C., each emulsion containing chloroprene 100 parts, disproportionated rosin 4 parts, water 249 parts, sodium salt of formaldehyde/naphthalene sulfonic acid condensation product ("Dexad 11") 0.6 part, and sodium hydroxide 0.8 part. The emulsions are cooled to 5° C., blanketed with nitrogen and polymerized at 5° C. Potassium hydrazodisulfonate (0.5 part) dissolved in water is added and then the oxidizing agent. The polymer is coagulated with acid and brine, then washed with water on a corrugated mill and dried by milling.

| Emulsion Number | Oxidizing Agent | Polymerization Time (minutes) | Yield of Polymer, Per Cent |
|---|---|---|---|
| 1 | Hydrogen peroxide (6.7 parts of 3% $H_2O_2$). | 140 | 40 |
| 2 | Sodium hypochlorite, 0.7 part of a water solution containing 4-5% active chlorine | 140 | 83 |
| 3 | Potassium persulfate 0.17 part | 140 | 66 |
| 4 | Potassium ferricyanide 0.17 part. | 140 | 75 |

The use of conventional catalysts such as persulfates, peroxides, or ferricyanides does not give rise to significant amounts of polymer from chloroprene at —10 and —20° C. Hydrogen peroxide and potassium persulfate will not give significant amounts of polymer at 5° C., during a two to three hour polymerization. Much longer times are required to effect polymerization with these catalysts.

The process of this invention is of generic application to the addition polymerization of polymerizable compounds having the non-aromatic or ethylenic, >C=C< group. It is applicable to monomeric unsaturated polymerizable compounds in which the unsaturation is due to a terminal ethylenic group which is attached to a negative radical. It is thus applicable to polymerizable vinylidene compounds, including vinyl compounds and particularly preferred are those which contain the $CH_2=C<$ group.

Compounds having a terminal methylene which are subject to polymerization and copolymerization include olefins, e. g. ethylene and isobutylene; acrylyl and alkacrylyl compounds, e. g. acrylonitrile, methyl acrylate, ethyl methacrylate, methacrylic acid, methacrylamide; vinyl and vinylidene halides; e. g. vinyl fluoride, vinylidene chloride; vinyl carboxylates, e. g., vinyl acetate, vinyl trimethylacetate; vinyl imides, N-vinyllactams, e. g. N-vinylcaprolactam; vinyl aryls such as styrene and other vinyl derivatives such as vinylpyridine, methyl vinyl ketone and vinyl ethyl ether.

Polyfluoroethylenes including tetrafluoroethylene, chlorotrifluoroethylene and 1,1-dichloro-2,2-difluoroethylene may be polymerized and copolymerized by the process of this invention.

Polymerizable compounds that have a plurality of ethylenic double bonds that may be polymerized or copolymerized include those having conjugated double bonds, such as butadiene and 2-chlorobutadiene, and compounds which contain two or more double bonds which are isolated with respect to each other, such as ethylene glycol dimethacrylate, methacrylic anhydride, diallyl maleate and divinyl benzene.

In addition to copolymers obtainable from the classes of monomers mentioned above, the copolymerization of fumaric or maleic esters with types of monomers mentioned, may be effected by the process of this invention. Furthermore, the term "polymerization" is meant to include within its scope, in addition to the polymerization of a monomer alone or of two or more monomers, i. e., copolymerization, the polymerization of unsaturated monomer in the presence of a chain transfer agent, e. g. carbon tetrachloride. The latter has been called "telomerization."

This invention is applicable to the polymerization of any unsaturated compound subject to addition polymerization by prior techniques. Optimum conditions may vary from monomer to monomer and since liquid phase polymerization is desired, gases such as ethylene and propylene require pressures.

The polymerizations are usually carried out at —40° C. to 60° C. Although temperatures may be lower, however the rate of polymerization is generally low. Higher temperatures, e. g., up to 100° C. or higher, may be used, particularly when the time of polymerization is to be kept at a minimum, e. g., in a continuous process. Although this invention may be practiced over a wide temperature range, optimum results are obtained at not more than 40° C. and suitably 0–40° C. in liquid aqueous systems. In general, the time required for substantial polymerization depends upon other variables such as the specific temperature and concentrations of monomer, catalyst, etc. Times of from a few minutes to 24 hours are customarily employed.

The polymerization may be carried out by conventional means. Liquid media in which the catalyst, monomer, and diluent are uniformly dispersed, such as solutions or emulsions, are preferred. In general, aqueous systems are preferred. For acrylonitrile polymerizations, aqueous systems which have been adjusted to a pH of 2–6 with a halogen acid give superior polymers.

Any hydrazodisulfonate salt which yields hydrazodisulfonate ion under the conditions of polymerization, i. e., any soluble hydrazodisulfonate, may be employed. The amount of hydrazodisulfonate that is employed may vary widely. Generally amounts of from 0.01 to 10% based on the weight of polymerizable monomers are employed. It is generally convenient to employ an alkali metal (sodium, potassium), ammonium or quaternary ammonium (tetraethylammonium) salt of the hydrazodisulfonate as the source of the ion.

Not all oxidizing agents may be employed. Thus sodium vanadate, sodium selenate, potassium perchlorate, potassium chlorate, and potassium nitrate had little or no effect. The examples are illustrative of the use, with advantageous results, of compounds having halogen of effective positive valence of one. In view of ease of preparation and use the compounds with positive monovalent halogen, e. g., the N-chloro compounds, the hypohalites, and hypochlorites are generally preferred. The amount of oxidizing agent present is generally less than the amount of hydrazodisulfonate and may be present in much smaller amounts, e. g. from 0.001 to 50% of the amount of hydrazodisulfonate.

Polymerizations by the process of this invention give high conversion of polymer at low temperatures. The hydrazodisulfonate is a non-oxidizing material and generally quite stable.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for the polymerization of a monomer subject to addition polymerization and containing an ethylenic double bond which comprises bringing said monomer in contact, in an aqueous system, with a water soluble hydrazodisulfonate and a compound containing positive monovalent halogen.

2. Process for the polymerization of a vinylidene monomer subject to addition polymerization which comprises bringing said monomer in contact, in an aqueous system, with a water soluble hydrazodisulfonate and a compound containing positive monovalent halogen.

3. Process for the polymerization of a vinyl monomer subject to addition polymerization which comprises bringing said monomer in contact, in an aqueous system, with a water soluble hydrazodisulfonate and a compound containing positive monovalent halogen.

MADISON HUNT.

REFERENCES CITED

The following references are of record in the file of this patent:

UNITED STATES PATENTS

| Number | Name | Date |
|---|---|---|
| 2,429,060 | Hoover et al. | Oct. 14, 1947 |

FOREIGN PATENTS

| Number | Country | Date |
|---|---|---|
| 333,894 | Great Britain | Aug. 18, 1930 |

OTHER REFERENCES

Mellor, vol. VIII, Comp. Treat of Inorg. and Theoretical Chem., pages 682–683, Longmans, N. Y. 1928.